United States Patent Office 2,908,706
Patented Oct. 13, 1959

2,908,706

O-ARYL O-METHYL PHOSPHOROAMIDO-THIOATES

Henry Tolkmith and Edgar C. Britton, Midland, Mich., assignors to The Dow Chemical Company, Midland, Mich., a corporation of Delaware No Drawing. Application March 5, 1956
Serial No. 569,230

3 Claims. (Cl. 260—461)

The present invention is concerned with the novel O-aryl O-alkyl phosphoroamidothioates of the following formula

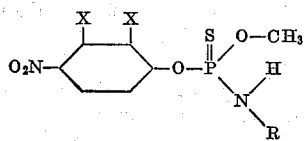

In this and succeeding formulae, R represents hydrogen, methyl or ethyl and one X represents chlorine and the other X represents hydrogen. These compounds are viscous liquids or crystalline solids which are somewhat soluble in many common organic solvents and of very low solubility in water. They are useful as preservatives for paper, paint and wood and as parasiticides for the control of bacteria, fungi, mites and insects such as aphids, Southern army worms, Mexican bean beetles and flies.

The new compounds may be prepared by reacting an O-aryl O-methyl phosphorochloridothioate of the formula

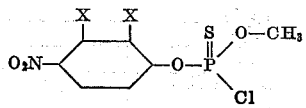

with ammonia, methylamine or ethylamine. The reaction is exothermic and takes place smoothly at the temperature range of from −10° to 30° C. with the formation of the desired product and ammonium hydrochloride or amine hydrochloride of reaction. The temperature may be controlled by regulation of the rate of contacting the reactants and by external cooling as may be required. The reaction is carried out in the presence of a solvent such as acetone, methyl ethyl ketone, methylene chloride or benzene. In a preferred operation, the reaction is carried out with aqueous ammonia or aqueous amine and in a water miscible solvent. Good results are obtained when at least two molecular proportions of ammonia or amine are reacted with each molecular proportion of the phosphorochloridothioate reagent.

In carrying out the reaction, gaseous ammonia or alkyl amine is contacted portionwise with the O-aryl O-methyl phosphorochloridothioate at a temperature of from −10° to 30° C. This operation is carried out in the presence of one or more of the aforementioned solvents. In an alternative procedure, an aqueous solution of ammonia or alkylamine is mixed and blended with the phosphorochloridothioate reagent dispersed in the solvent. Following the reaction, the reaction mixture may be washed with water to separate water soluble salts such as ammonium hydrochloride or amine hydrochloride. Upon evaporation of the solvent the desired product is obtained as a crystalline solid or viscous oily liquid.

In an alternative method the new compounds may be prepared by reacting an alkali metal alcoholate with an O-aryl phosphoroamidochloridothioate of the formula

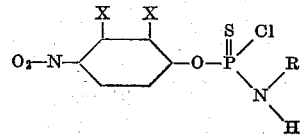

The reaction is somewhat exothermic and takes place smoothly at temperatures of from −5° to 40° C. The temperature may be controlled by regulating the rate of contacting the reactants and by external cooling. Good results are obtained when employing substantially equimolecular proportions of the reactants. The reaction may be carried out in an inert organic solvent and conveniently in an excess of the alcohol employed in the preparation of the alcoholate. Following completion of the reaction, the reaction mixture may be successively washed with water, and dilute aqueous alkali metal hydroxide to separate any unreacted starting materials and obtain the desired product as a residue.

The following examples illustrate the invention and are not to be considered as limiting.

EXAMPLE I

O-(2-chloro-4-nitrophenyl) O-methyl phosphoroamidothioate

O - (2 - chloro - 4 - nitrophenyl) O - methyl phosphorochloridothioate (58 grams, 0.192 mole) was dispersed in 100 milliliters of acetone and a ten percent aqueous solution of ammonia added portionwise thereto until the mixture showed a pH of from 6.5 to 7.0. The addition was carried out at a temperature of from 3° to 12° C. and required the employment of 56 cc. of the ammonia solution (equivalent to 0.329 mole of NH$_3$). Following the addition, the acetone was separated by evaporation. During this operation, an O-(2-chloro-4-nitrophenyl) O-methyl phosphoroamidothioate product separated in the mixture as a crystalline solid. This product was separated by filtration. The separated product was recrystallized from a mixture of ethanol and cyclohexane and found to melt at 41°–43° C.

EXAMPLE II

O-(3-chloro-4-nitrophenyl) O-methyl N-methyl phosphoroamidothioate

Sodium (2.07 grams, 0.09 mole) was dissolved in 60 milliliters of methanol to prepare a solution of sodium methylate in methyl alcohol. This solution was then added to 27.1 grams (0.09 mole) of 3-chloro-4-nitrophenyl N-methyl phosphoroamidochloridothioate dissolved in 100 milliliters of methanol. The addition was carried out with stirring and at a temperature of from 2° to 6° C. Following the addition the reaction mixture was set aside for 16 hours at room temperature to complete the reaction. The reaction mixture was then diluted with cyclohexane. During the dilution, the sodium chloride of reaction separated in the mixture as a crystalline solid and was recovered by filtration. The methanol and cyclohexane solvents were then removed from the filtrate by evaporation and the residue diluted with hot cyclohexane, filtered and the cyclohexane evaporated from the filtrate. As a result of these operations there was obtained an O-(3-chloro-4-nitrophenyl) O-methyl N-methyl phosphoroamidothioate as a viscous liquid having a refractive index n/D of 1.5709 at 20° C. and a phosphorus content of 10.8 percent and a chlorine content of 10.99 percent as compared, respectively, to theoretical contents of 10.5 and 10.8 percent.

EXAMPLE III

O-(*2-chloro-4-nitrophenyl*) O-*methyl N-ethyl phosphoramidothioate*

O-(2-chloro-4-nitrophenyl) O-methyl phosphoroamidothioate (0.5 mole) is dispersed in 250 milliliters of acetone and a 20 percent aqueous solution of ethylamine added portionwise thereto at a temperature of from 10° to 20° C. until the mixture showed a pH of 6.5. The reaction mixture is then left at room temperature for three hours and thereafter washed with water to obtain an O-(2-chloro-4-nitrophenyl) O-methyl N-methyl phosphoroamidothioate product as a viscous liquid having a molecular weight of 310.

In a similar manner other phosphoroamidothioate products may be obtained as follows:

O-(3-chloro-4-nitrophenyl) O-methyl phosphoroamidothioate by reacting together O-(3-chloro-4-nitrophenyl) phosphoroamidochloridothioate and sodium methylate.

O-(2-chloro-4-nitrophenyl) O-methyl N-methyl phosphoroamidothioate by reacting together O-(2-chloro-4-nitrophenyl) O-methyl phosphorochloridothioate and methylamine.

O-(3-chloro-4-nitrophenyl) O-methyl N-ethyl phosphoroamidothioate by reacting together O-(3-chloro-4-nitrophenyl) O-methyl phosphorochloridothioate and ethylamine.

The new O-aryl O-methyl phosphoroamidothioate products are effective as parasiticides and are adapted to be employed for the control of household and agricultural pests. For such use, the products may be dispersed on a finely divided solid and employed as dusts. Also the new products may be employed in oils, as toxic constituents of oil in water emulsions, or in water dispersions. In representative operations, 100 percent controls of the two-spotted spider mites and bean aphids have been obtained with aqueous compositions containing 100 parts by weight of O-(2-chloro-4-nitrophenyl) O-methyl phosphoroamidothioate per million parts by weight of composition.

The O-aryl O-methyl phosphorochloridothioates employed as starting materials as herein described may be prepared by reacting one molecular proportion of a suitable O-aryl phosphorodichloridothioate with one molecular proportion of sodium methylate in an inert organic solvent such as benzene. In carrying out the reaction the reactive agents and solvent are mixed together and thereafter heated for a period of time at a temperature of from 20° to 80° C. The reaction mixture is then successively washed with dilute aqueous sodium hydroxide and water and the solvent thereafter separated by evaporation to obtain the desired starting material as a liquid residue.

The O-aryl phosphoroamidochloridothioates to be employed as starting materials may be prepared by reacting one molecular proportion of a suitable O-aryl phosphorodichloridothioate with two molecular proportions of ammonia, methylamine or ethylamine. In carrying out the reaction the ammonia or amine is added portionwise to the phosphorodichloridothioate dispersed in an inert organic solvent at a temperature of frm 0° to 40° C. Following the reaction, the reaction mixture is washed with water to separate ammonium or amine hydrochloride. Upon evaporation of the solvent the desired starting material is obtained as a residue.

We claim:
1. An O-aryl O-methyl phosphoroamidothioate of the formula

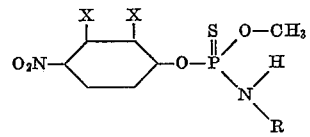

wherein one X represents chlorine and the other X represents hydrogen and R represents a member of the group consisting of hydrogen, methyl and ethyl.

2. O-(2-chloro-4-nitrophenyl) O-methyl phosphoroamidothioate.

3. O-(3-chloro-4-nitrophenyl) O-methyl N-methyl phosphoroamidothioate.

References Cited in the file of this patent

UNITED STATES PATENTS

| | | |
|---|---|---|
| 2,552,576 | Moyle | May 15, 1951 |
| 2,664,437 | Fletcher | Dec. 29, 1953 |

FOREIGN PATENTS

| | | |
|---|---|---|
| 814,152 | Germany | Sept. 20, 1951 |